United States Patent
Rice et al.

(10) Patent No.: US 11,897,990 B2
(45) Date of Patent: Feb. 13, 2024

(54) CURABLE POLY(POLYPHENYLENE ETHER) OLIGOMER COMPOSITIONS FOR COATINGS

(71) Applicant: SHPP GLOBAL TECHNOLOGIES B.V., Bergen op Zoom (NL)

(72) Inventors: Brian Jason Rice, Huntersville, NC (US); Eylem Tarkin-Tas, Delmar, NY (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 88 days.

(21) Appl. No.: 17/606,905

(22) PCT Filed: Apr. 3, 2020

(86) PCT No.: PCT/US2020/026498
§ 371 (c)(1),
(2) Date: Oct. 27, 2021

(87) PCT Pub. No.: WO2020/222973
PCT Pub. Date: Nov. 5, 2020

(65) Prior Publication Data
US 2022/0204677 A1  Jun. 30, 2022

Related U.S. Application Data

(60) Provisional application No. 62/841,182, filed on Apr. 30, 2019.

(51) Int. Cl.
| | | |
|---|---|---|
| C08F 2/46 | (2006.01) | |
| C08F 2/50 | (2006.01) | |
| C08G 61/04 | (2006.01) | |
| C08F 290/06 | (2006.01) | |
| C08J 5/24 | (2006.01) | |
| C09D 4/00 | (2006.01) | |
| C09D 151/08 | (2006.01) | |
| C09J 4/00 | (2006.01) | |
| C09J 151/08 | (2006.01) | |

(52) U.S. Cl.
CPC ...... C08F 290/062 (2013.01); C08F 290/068 (2013.01); C08J 5/249 (2021.05); C09D 4/00 (2013.01); C09D 151/085 (2013.01); C09J 4/00 (2013.01); C09J 151/085 (2013.01); C08J 2351/08 (2013.01)

(58) Field of Classification Search
CPC ............ C08F 290/068; C08F 290/062; C09D 151/085; C09D 4/00; C09D 183/12; C08J 5/249; C08J 2351/08; C08K 5/103; C08K 5/07; C09J 4/00; C09J 151/085; C08G 65/485; C08G 77/46; C08L 71/126; C08L 33/06
USPC .............. 522/33, 6, 189, 184, 71, 1; 520/1
See application file for complete search history.

(56) References Cited

U.S. PATENT DOCUMENTS

| | | | |
|---|---|---|---|
| 3,306,874 A | 2/1967 | Hay | |
| 5,199,098 A | 3/1993 | Nolan et al. | |
| 6,835,785 B2 | 12/2004 | Ishii et al. | |
| 7,354,533 B2 | 4/2008 | Yeager et al. | |
| 8,444,762 B2 | 5/2013 | OBrien et al. | |
| 8,722,837 B2 | 5/2014 | Carrillo et al. | |
| 9,062,145 B2 | 6/2015 | Ohno et al. | |
| 2001/0053820 A1 | 12/2001 | Yeager et al. | |
| 2004/0198863 A1 | 10/2004 | Ishii et al. | |
| 2008/0033141 A1* | 2/2008 | Bates ............... | C08G 65/485 528/217 |
| 2008/0071000 A1 | 3/2008 | Braidwood et al. | |
| 2016/0369040 A1 | 12/2016 | Das et al. | |
| 2017/0044394 A1 | 2/2017 | Xu et al. | |
| 2019/0203067 A1 | 7/2019 | Jeng et al. | |
| 2021/0269574 A1* | 9/2021 | Tarkin-Tas ............ | C08K 5/14 |

FOREIGN PATENT DOCUMENTS

| | | |
|---|---|---|
| CN | 108641337 A | 10/2018 |
| EP | 2892959 | 3/2014 |
| JP | 2003252833 A | 9/2003 |
| JP | 2004523615 A | 8/2004 |
| JP | 2011519983 | 7/2011 |
| JP | 2015510534 A | 4/2015 |
| WO | 2009104107 A1 | 8/2009 |
| WO | 2010039430 A2 | 4/2010 |

OTHER PUBLICATIONS

"Energy curing for industrial coatings and graphic arts", High Lights! BASF The Chemical Company, 2012; 32 pages.
International Search Report for International Application No. PCT/US2020/026498; International filing date: Apr. 3, 2020; dated Jul. 1, 2020; 6 pages.
Written Opinion of the International Searching Autority for International Application No. PCT/US2020/026498; International filing date: Apr. 3, 2020; dated Jul. 1, 2020; 8 pages.
Office Action issued by the Japan IP Office dated Nov. 30, 2023 for corresponding Japanese Patent Application 2021-564538 filed Oct. 29, 2021, English translation, 5 pages.

* cited by examiner

*Primary Examiner* — Jessica Whiteley
(74) *Attorney, Agent, or Firm* — CANTOR COLBURN LLP

(57) ABSTRACT

An ultraviolet light-curable coating composition includes 5-40 weight percent of an ultraviolet light-curable poly (polyphenylene ether) oligomer; 60-95 weight percent of an ultraviolet light-curable monomer, oligomer, polymer, or a combination thereof; and 0.01-3 weight percent of a photoinitiator.

18 Claims, No Drawings

CURABLE POLY(POLYPHENYLENE ETHER) OLIGOMER COMPOSITIONS FOR COATINGS

CROSS REFERENCE TO RELATED APPLICATIONS

This application is a National Stage application PCT/US2020/026498 filed Apr. 3, 2020, which claims the benefit of U.S. Provisional Application No. 62/841,182, filed Apr. 30, 2019, both of which are incorporated by reference in their entirety herein.

BACKGROUND

This disclosure relates to curable coating compositions, and in particular curable coating compositions comprising poly(polyphenylene ether) oligomers.

Coatings for substrates can be required to have high heat resistance, high impact strength, and low moisture absorption depending on the end use application. Poly(polyphenylene ether)s generally have good electric properties, high heat resistance, and moisture resistance, but low impact strength. There is a need for a poly(polyphenylene ether) coating composition having a high glass transition temperature and low moisture absorption, together with improved good toughness. Such coating compositions, if capable of ultraviolet light curing, would further be useful in coating a wider variety of heat-sensitive substrates.

BRIEF DESCRIPTION

Disclosed is an ultraviolet light-curable coating composition comprising: 5-40 weight percent of an ultraviolet light-curable poly(polyphenylene ether) oligomer; 60-95 weight percent of a co-curable n ultraviolet light-reactive monomer, oligomer, polymer, or a combination thereof; and 0.01-3 weight percent of a photoinitiator.

A method of forming the ultraviolet light-curable coating composition is disclosed.

Also disclosed is a thermoset composition comprising a cured product of the ultraviolet light-curable coating composition.

Also disclosed are a method of coating an article with the coating composition to form a coated article, and articles comprising the coating composition.

The above described and other features are exemplified by the following figures and detailed description.

DETAILED DESCRIPTION

Disclosed herein are curable coating compositions, particularly ultraviolet light (UV)-curable coating compositions comprising poly(polyphenylene ether) oligomers, processes for making the curable coating compositions, and articles coated with the curable coating compositions. The compositions have desirable properties, including improved glass transition temperatures, good toughness, and low moisture absorption, resulting in higher performing compositions for coating substrates.

The coating composition is UV-curable, and comprises an ultraviolet light-curable poly(polyphenylene ether) oligomer as described below; a co-curable monomer, oligomer, polymer, or a combination thereof, also as described below; and a UV light photoinitiator. The bifunctional monomer contains ethylenically unsaturated terminal functional groups that are UV-curable, i.e., reactive in the presence of free radicals generated by the action of ultraviolet light on the photoinitiator. The co-curable monomer, oligomer, polymer, or combination thereof also contains ethylenically unsaturated terminal functional groups that are UV-curable, i.e., reactive in the presence of free radicals generated by the action of ultraviolet light on the photoinitiator. As used herein, "curable" and "cure" refer to both polymerization and crosslinking reactions between the components of the UV-curable coating composition.

The poly(polyphenylene ether) oligomer includes repeating structural units of formula (1)

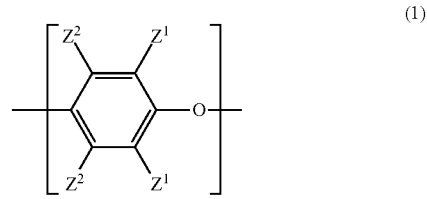

(1)

wherein each occurrence of $Z^1$ is independently halogen, unsubstituted or substituted $C_{1-12}$ primary or secondary hydrocarbyl, $C_{1-12}$ hydrocarbylthio, $C_{1-12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms.

In a preferred embodiment in formula (1), each occurrence of $Z^1$ is independently halogen, unsubstituted or substituted $C_{1-6}$ primary or secondary hydrocarbyl, $C_{1-6}$ hydrocarbylthio, $C_{1-6}$ hydrocarbyloxy, or $C_2$-$C_7$ halohydrocarbyloxy wherein at least two carbon atoms separate the halogen and oxygen atoms; and each occurrence of $Z^2$ is independently hydrogen, halogen, unsubstituted or substituted $C_{1-6}$ primary or secondary hydrocarbyl, $C_{1-6}$ hydrocarbylthio, $C_{1-6}$ hydrocarbyloxy, or $C_{2-7}$ halohydrocarbyloxy wherein at least two carbon atoms separate the halogen and oxygen atoms.

In a more preferred embodiment, each occurrence of $Z^1$ is independently halogen, or unsubstituted or substituted primary $C_{1-6}$ hydrocarbyl; and each occurrence of $Z^2$ is independently hydrogen, halogen, or unsubstituted or substituted primary $C_{1-6}$ hydrocarbyl; and even more preferably in this embodiment, each occurrence of $Z^1$ is the same and each occurrence of $Z^2$ is the same or different. The poly(polyphenylene ether) oligomer can comprise units having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. Thus, $Z^1$ and $Z^2$ can each independently be hydrogen, cyclohexyl, phenyl, di-n-butylaminomethyl, morpholinomethyl or a combination thereof. In a preferred aspect, the poly(polyphenylene ether) oligomer comprises 2,6-dimethyl-1,4-phenylene ether units, 2,3,6-trimethyl-1,4-phenylene ether units, or a combination thereof. In some aspects, the poly(polyphenylene ether) oligomer comprises poly(2,6-dimethyl-1,4-phenylene ether) units.

The poly(polyphenylene ether) oligomer can be monofunctional or bifunctional. In some aspects, the poly(polyphenylene ether) oligomer can be monofunctional. For example, it can be monofunctional, having a UV light-curable functional group at one terminus of the oligomer chain. The functional group can be, for example, a vinyl, allyl, or (meth)acrylate group, preferably a methacrylate group. Alternatively the poly(polyphenylene ether) oligomer can be bifunctional, having UV light-curable functional groups at both termini of the oligomer chain. The functional groups can be vinyl, allyl, or (meth)acrylate groups, preferably methacrylate groups.

In some aspects, the poly(polyphenylene ether) oligomer comprises a monofunctional or bifunctional poly(polyphenylene ether) oligomer of formula (2)

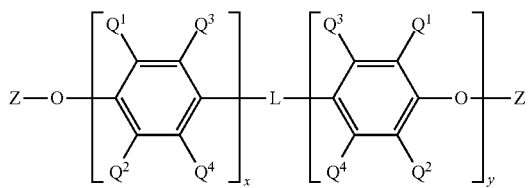
(2)

wherein each occurrence of $Q^1$ and $Q^2$ is independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, or $C_{2-12}$ halohydrocarbyloxy wherein at least two carbon atoms separate the halogen and oxygen atoms; each Z is independently hydrogen, allyl, vinyl, or (meth)acrylate provided that at least one Z is allyl, vinyl, or (meth)acrylate; x and y have an average value, and are each independently 0-30, or 0-20, preferably 0-15, still more preferably 0-10, even more preferably 0-8, provided that the sum of x and y is at least 2, preferably at least 3, more preferably at least 4.

Further in formula (2), L is of formula (3) or formula (4) as described below. L can be of formula (3)

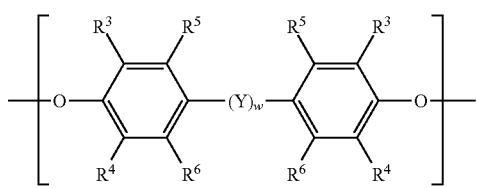
(3)

wherein each occurrence of $R^3$, $R^4$, $R^5$, and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; w is 0 or 1; and Y is

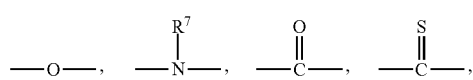

-continued

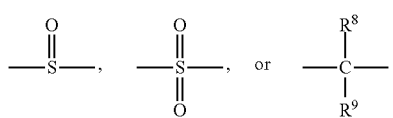

wherein each occurrence of $R^7$ is independently hydrogen or $C_{1-12}$ hydrocarbyl, each occurrence of $R^8$ and $R^9$ is independently hydrogen, $C_{1-12}$ hydrocarbyl, or $R^8$ and $R^9$ together form a $C_{4-12}$ cyclohydrocarbylene with the carbon atom. In a preferred aspect in formula (3), each of $R^3$, $R^4$, $R^5$, and $R^6$ is independently hydrogen, halogen, unsubstituted or substituted $C_{1-6}$ primary or secondary hydrocarbyl; and w is 0 or 1.

In another aspect, L in formula (3) is of formula (4)

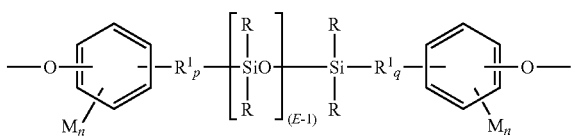
(4)

wherein E is 6-100, or 11-80, or 11-60; and each occurrence of R is independently an unsubstituted or substituted $C_{1-13}$ alkyl, $C_{1-13}$ alkoxy, $C_{3-6}$ cycloalkyl, $C_{3-6}$ cycloalkoxy, $C_{6-14}$ aryl, $C_{6-10}$ aryloxy, $C_{7-13}$ arylalkylene, or $C_{7-13}$ alkylarylene. The foregoing groups can be fully or partially halogenated with fluorine, chlorine, bromine, or iodine, or a combination thereof. Further in formula (4), each p and q are independently 0 or 1; $R^1$ is a divalent $C_{2-8}$ aliphatic group, and each occurrence of M is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, wherein each n is independently 0, 1, 2, 3, or 4. Preferably in formula 4, E is 5-60; each occurrence of R is independently $C_{1-6}$ alkyl, $C_{3-6}$ cycloalkyl, or $C_{6-14}$ aryl, more preferably methyl; p and q are each 1; $R^1$ is a divalent $C_{2-8}$ aliphatic group, M is halogen, cyano, $C_{1-4}$ alkyl, $C_{1-4}$ alkoxy, $C_{6-10}$ aryl, $C_{7-12}$ aralkyl, or $C_{7-12}$ alkylaryl, more preferably methyl or methoxy; and each n is independently 0, 1, or 2.

In some aspects, L is of formula (4a)

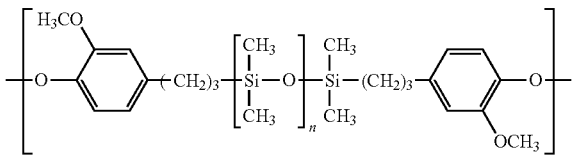
(4a)

wherein n has an average value of 5-100, or 10-80, or 10-60.

In an aspect, the poly(polyphenylene ether) oligomer comprises a bifunctional poly(polyphenylene ether) oligomer of formula (2a)

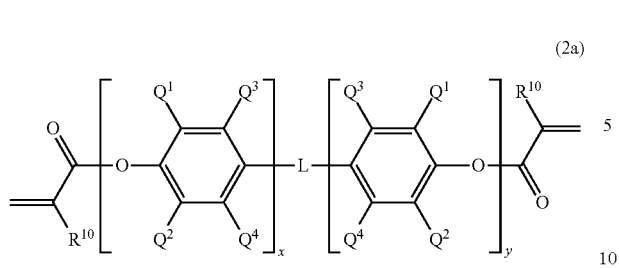

(2a)

wherein $Q^1$, $Q^2$, $Q^3$, $Q^4$, L, x and y are as defined in formulas (2), (3), or (4) and $R^{10}$ is methyl or hydrogen. In an aspect, $Q^1$, $Q^2$, $Q^3$ or $Q^4$ is hydrogen, methyl, cyclohexyl, phenyl, di-n-butylaminomethyl, or morpholinomethyl, or a combination thereof.

In some aspects the poly(polyphenylene ether) oligomer comprises a bifunctional poly(polyphenylene ether) oligomer of formula (2b)

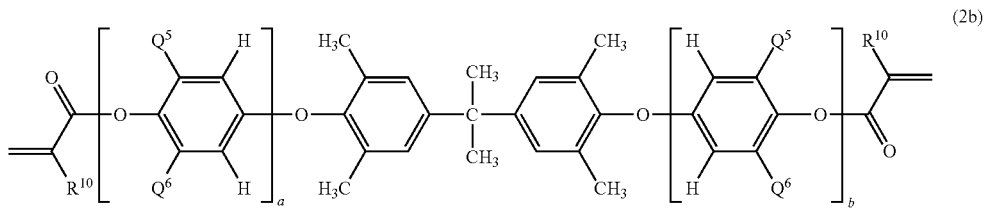

(2b)

wherein each occurrence of $Q^5$ and $Q^6$ is independently methyl, cyclohexyl, phenyl, di-n-butylaminomethyl, or morpholinomethyl; and each occurrence of a and b is independently 0-20, with the proviso that the sum of a and b is at least 2; and each occurrence of $R^{10}$ is independently methyl or hydrogen. Preferably in formula (2b), each occurrence of $Q^5$ and $Q^6$ is independently methyl, cyclohexyl, phenyl, di-n-butylaminomethyl, or morpholinomethyl, and each $R^{10}$ is methyl. Suitable poly(polyphenylene ether) oligomers of this type are commercially available, for example NORYL SA9000, from SABIC.

The bifunctional poly(polyphenylene ether) oligomers of formula (2) can be prepared by derivatization of a hydroxyl-terminated poly(polyphenylene ether) oligomer prepared by oxidative polymerization of at least one monohydric phenol, optionally in combination with at least one dihydric or polyhydric phenol, in the presence of a polymerization catalyst comprising a catalyst metal ion and a catalyst amine ligand, oxygen, and solvent. The polymerization catalyst can be prepared in situ by mixing the catalyst metal ion and the catalyst amine ligand. The solvent can be benzene, toluene, xylenes, mesitylene, chlorobenzene, dichlorobenzenes, chloroform, or combinations thereof. In some aspects, the solvent comprises toluene. The molecular oxygen can be provided, for example, in a purified form or as air. Derivatization of one or both of the terminal hydroxyl groups to provide groups Z can be by methods known in the art.

The poly(polyphenylene ether) oligomer can further be a block copolymer comprising a poly(phenylene ether) block including units as described above in formula (1), end groups Z as described in formula (2), and an aryloxy-terminated polysiloxane block having repeating siloxane units of formula (5)

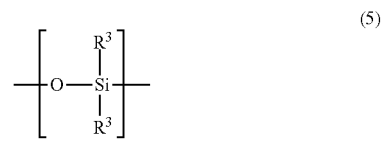

(5)

wherein each occurrence of $R^3$ is independently $C_{1-12}$ hydrocarbyl or $C_{1-12}$ halohydrocarbyl; and the polysiloxane block further comprises a terminal unit of formula (6)

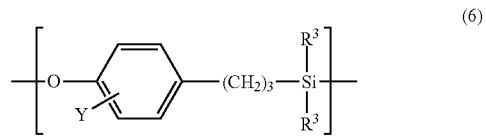

(6)

wherein Y is hydrogen, halogen, $C_{1-12}$ hydrocarbyl, or $C_{1-12}$ hydrocarbyloxy, and each occurrence of $R^3$ is independently hydrogen, $C_{1-12}$ hydrocarbyl, or $C_{1-12}$ halohydrocarbyl. Preferably Y is hydrogen, halogen, $C_{1-6}$ hydrocarbyl, or $C_{1-6}$ hydrocarbyloxy, and each occurrence of $R^3$ is independently hydrogen, $C_{1-6}$ hydrocarbyl, or $C_{1-6}$ halohydrocarbyl. Still more preferably Y is hydrogen, methyl, or methoxy, and each $R^3$ is methyl. In some aspects, the polysiloxane block is of formula (7)

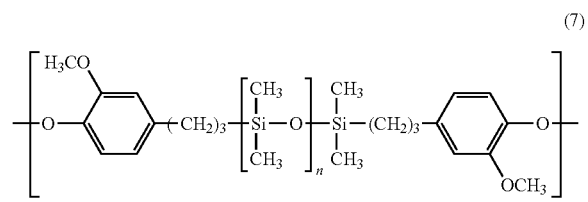

(7)

wherein n has an average value of 5-80 or 10-60. In an aspect the block copolymer comprises poly(2,6-dimethyl-1,4-phenylene ether) blocks, poly(2,6-dimethyl-1,4-phenylene ether-co-2,3,6-trimethyl-1,4-phenylene ether)

blocks, or a combination thereof; polysiloxane blocks of formula comprising, on average, 10-100 siloxane repeating units of formula (7); and terminal Z groups as described in formula (2), preferably (meth)acrylate groups. Manufacture of hydroxyl-terminated block copolymers are described, for example, in U.S. Pat. No. 8,722,837. Derivatization of one or both of the terminal hydroxyl groups to provide groups Z can be by methods known in the art. In In some aspects, the poly(polyphenylene ether) oligomer is essentially free of incorporated diphenoquinone residues. In the context, "essentially free" means that the less than 1 weight percent (wt. %) of poly(polyphenylene ether) oligomer molecules comprise the residue of a diphenoquinone. As described in U.S. Pat. No. 3,306,874 to Hay, synthesis of poly(polyphenylene ether) oligomer by oxidative polymerization of monohydric phenol yields not only the desired poly(polyphenylene ether) oligomer but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(polyphenylene ether) oligomer (i.e., the diphenoquinone is incorporated into the poly(polyphenylene ether) oligomer structure) by heating the polymerization reaction mixture to yield a poly(polyphenylene ether) oligomer comprising terminal or internal diphenoquinone residues. For example, when a poly(polyphenylene ether) oligomer is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(polyphenylene ether) oligomer with terminal and internal residues of incorporated diphenoquinone. However, such reequilibration reduces the molecular weight of the poly(polyphenylene ether) oligomer. Accordingly, when a higher molecular weight poly(polyphenylene ether) oligomer is desired, it can be desirable to separate the diphenoquinone from the poly(polyphenylene ether) oligomer rather than reequilibrating the diphenoquinone into the poly(polyphenylene ether) oligomer chains. Such a separation can be achieved, for example, by precipitation of the poly(polyphenylene ether) oligomer in a solvent or solvent mixture in which the poly(polyphenylene ether) oligomer is insoluble and the diphenoquinone is soluble. For example, when a poly(polyphenylene ether) oligomer is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1-4 volumes of methanol or a methanol/water mixture. Alternatively, the amount of diphenoquinone side-product generated during oxidative polymerization can be minimized (e.g., by initiating oxidative polymerization in the presence of less than 10 wt. % of the monohydric phenol and adding at least 95 wt. % of the monohydric phenol over the course of at least 50 minutes), and/or the reequilibration of the diphenoquinone into the poly(polyphenylene ether) oligomer chain can be minimized (e.g., by isolating the poly(polyphenylene ether) oligomer no more than 200 minutes after termination of oxidative polymerization). These approaches are described in International Patent Application Publication No. WO2009/104107 A1 of Delsman et al. In an alternative approach using the temperature-dependent solubility of diphenoquinone in toluene, a toluene solution containing diphenoquinone and poly(polyphenylene ether) oligomer can be adjusted to a temperature of 25° C., at which diphenoquinone is poorly soluble but the poly(polyphenylene ether) oligomer is soluble, and the insoluble diphenoquinone can be removed by solid-liquid separation (e.g., filtration).

The poly(polyphenylene ether) oligomers useful herein are to lower molecular weight poly(polyphenylene ether) oligomers. The poly(polyphenylene ether) oligomer can have a number average molecular weight of 500-7,000 grams per mole (g/mol), and a weight average molecular weight of 500-15,000 g/mol, as determined by gel permeation chromatography using polystyrene standards. In some aspects, the number average molecular weight can be 750-4,000 g/mol, and the weight average molecular weight can be 1,500-9,000 g/mol, as determined by gel permeation chromatography using polystyrene standards.

In some aspects, the poly(polyphenylene ether) oligomer has an intrinsic viscosity of 0.03-1 deciliter per gram. For example, the poly(polyphenylene ether) oligomer can have an intrinsic viscosity of 0.25-1 deciliter per gram (dl/g), or 0.25-0.7 dl/g, or 0.35-0.55 dl/g, 0.35-0.50 dl/g, each measured at 25° C. in chloroform using an Ubbelohde viscometer. In other aspects, the poly(polyphenylene ether) oligomer can have an intrinsic viscosity of 0.03-0.13 dl/g, or 0.05-0.1 dl/g, or 0.1-0.15 dl/g, measured at 25° C. in chloroform using an Ubbelohde viscometer. The poly(phenylene ether)-polysiloxane block copolymer can have an intrinsic viscosity of at least 0.1 dl/g, as measured by Ubbelohde viscometer at 25° C. in chloroform. In some embodiments, the intrinsic viscosity is 0.1-0.5 dl/g.

The UV light-curable coating composition further includes a monomer, oligomer, polymer, or a combination thereof co-curable with the poly(polyphenylene ether) oligomer. The co-curable monomer, oligomer, polymer, or combination thereof can include straight- or branched-chain alkyl, cyclic, or aromatic, or partially aromatic groups, and the type and amount is selected to provide the desired degree of cure (polymerization or crosslinking), the desired viscosity in the coating composition, and the desired properties in the cured coating.

Oligomeric or polymeric (meth)acrylates can be present, such as polyester acrylates, amine-modified polyether acrylates, aliphatic urethane acrylates, and polyurethane acrylates.

In an aspect, a UV light-curable monomer is used. These include vinyl, allyl, or (meth)acrylate-containing UV light-curable monomers that can be incorporated in the UV light-curable coating composition include mono-, di-, tri-, tetra- and higher functionality vinyl, allyl, or (meth)acrylates, numerous specific examples of which are well known in the art. The monomer can be straight- or branched-chain alkyl, cyclic, or partially aromatic.

The UV light-curable monomer can be a (meth)acrylate monomer having one or more acrylate or methacrylate moieties per monomer molecule. The (meth)acrylate monomer can be mono-, di-, tri-, tetra- or penta-functional. In an aspect, di-functional monomers are used to obtain the desired flexibility and adhesion of the cured coating. The (meth)acrylate monomer can be straight- or branched-chain alkyl, cyclic, or partially aromatic. The UV light-curable monomer can also comprise a combination of monomers that, on balance, result in a desired adhesion for a coating composition on the substrate, where the coating composition can cure to form a hard, flexible material having the desired properties.

Useful (meth) acrylate monomers include the mono-(meth)acrylates, in particular (meth) acrylate esters of substituted or unsubstituted $C_{1-36}$ hydrocarbyl groups such as 2-(2-ethoxyethoxy)ethyl acrylate, 2-phenoxyethyl acrylate, 2-phenoxyethyl methacrylate, alkoxylated lauryl acrylate, alkoxylated phenol acrylate, alkoxylated phenol methacrylate, alkoxylated tetrahydrofurfuryl acrylate, butyl acrylate, butyl methacrylate, caprolactone acrylate, cyclic trimethylolpropane formal acrylate, dicyclopentadienyl methacrylate, ethoxylated hydroxyethyl methacrylate, ethoxylated nonyl phenol acrylate, ethoxylated nonyl phenol methacrylate, ethoxylated nonyl phenyl acrylate, ethylhexyl methacrylate, isobornyl acrylate, isobornyl methacrylate, isodecyl acrylate, isodecyl methacrylate, isooctyl acrylate, lauryl acrylate, lauryl methacrylate, methoxy polyethylene glycol monoacrylate, methoxy polyethylene glycol monomethacrylate, methyl acrylate, methyl methacrylate, octyldecyl acrylate, polypropylene glycol monomethacrylate, polyurethane acrylate, polyurethane methacrylate, propoxylated allyl methacrylate, propyl acrylate, propyl methacrylate, stearyl acrylate, stearyl methacrylate, tetrahydrofurfuryl acrylate, tetrahydrofurfuryl methacrylate, tridecyl acrylate, tridecyl methacrylate, and the like.

Useful polyfunctional (di-, tri-, tetra- or penta-functional) (meth)acrylates include to $C_{2-12}$ hydrocarbon diol di(meth)acrylates such as 1,6-hexanediol diacrylate (HDDA), 1,6-hexanediol dimethacrylate, trimethylolpropane triacrylate, trimethylolpropane trimethacrylate, tripropylene glycol di(meth) acrylate, neopentyl glycol di(meth)acrylate, neopentyl glycol propoxylate di(meth)acrylate, neopentyl glycol ethoxylate di(meth)acrylate, polyethylene glycol poly (meth)acrylate, and the like.

For example, the (meth)acrylate monomer can be 1,6-hexanediol diacrylate (HDDA), alone or in combination with another monomer, such as tripropylene glycol diacrylate (TPGDA), trimethylolpropane triacrylate (TMPTA), or octyl/decyl acrylate (ODA).

In certain aspects, the UV light-curable monomer, oligomer, or polymer is dipropylene glycol diacrylate, 1,6-hexanediol diacrylate, tripropylene glycol diacrylate, isobornyl acrylate, isobornyl methacrylate, a polyether acrylate, an amine-modified polyether acrylate, a polyester acrylate, a polyurethane acrylate, an aliphatic urethane acrylate, or a combination thereof.

Although the curable coating composition can, over time, provide a cured coating at ambient conditions, optimum results are achieved in the presence of a free radical curing agent activated by UV light. There are no special restrictions on the nature of the useful photoinitiators provided that they generate radicals by the absorption of energy. The curable coating composition therefore includes a photoinitiator. Optional additional types of free radical initiators can be present, for example a heat-activated free radical initiator to provide a two-part cure, UV light and heat. Generally, a photoinitiator can be used if the coating composition is to be UV cured.

The photoinitiator is present in amount effective amount to promote UV light cure at reasonable cure speed without causing premature gelation of the coating composition. Photoinitiators can include, but are not limited to α-hydroxyketone, hydroxycyclohexylphenyl ketone, hydroxymethylphenylpropanone, dimethoxyphenylacetophenone, 2-methyl-1-[4-(methylthio)phenyl]-2-morpholinopropanone-1, 1-(4-isopropylphenyl)-2-hydroxy-2-methylpropan-1-one,1-(4-dodecylphenyl)-2-hydroxy-2-methylpropan-1-one, 4-(2-hydroxyethoxy) phenyl-(2-hydroxy-2-propyl) ketone, diethoxyacetophenone, 2,2-di-sec-butoxyacetophenone, diethoxy-phenyl acetophenone, bis (2,6-dimethoxybenzoyl)-2,4-, 4-trimethylpentylphosphine oxide, 2,4,6-trimethylbenzoyldiphenylphosphine oxide, 2,4,6-trimethylbenzoylethoxyphenylphosphine oxide, or a combination thereof.

The UV light-curable coating composition can comprise 5-40 wt. % of the poly(polyphenylene ether) oligomer; 60-95 wt. % of the ultraviolet light-curable monomer, oligomer, polymer, or a combination thereof; and 0.01-3 wt. % of the UV light-activated photoinitiator, each based on the total weight of the curable composition, to provide a total of 100 wt. %. In another aspect, the UV light-curable coating composition can comprise 10-40 wt. % of the poly(polyphenylene ether) oligomer; 60-90 wt. % of the ultraviolet light-curable monomer, oligomer, polymer, or a combination thereof; and 0.01-3 wt. % of the UV light-activated photoinitiator, each based on the total weight of the curable composition, to provide a total of 100 wt. %. In another aspect, UV light-curable coating composition can comprise 20-40 wt. % of the poly(polyphenylene ether) oligomer; 60-80 wt. % of the ultraviolet light-curable monomer, oligomer, polymer, or a combination thereof; and 0.01-3 wt. % of the UV light-activated photoinitiator, each based on the total weight of the curable composition, to provide a total of 100 wt. %. In yet another aspect, UV light-curable coating composition can comprise 25-35 wt. % of the poly(polyphenylene ether) oligomer; 55-75 wt. % of the ultraviolet light-curable monomer, oligomer, polymer, or a combination thereof; and 0.01-3 wt. % of the UV light-activated photoinitiator, each based on the total weight of the curable composition, to provide a total of 100 wt. %.

The curable coating composition can, optionally, further comprise one or more additives known in the art, for example, a stabilizer, mold release agent, lubricant, processing aid, drip retardant, nucleating agent, UV blocker, dye, pigment, antioxidant, anti-static agent, blowing agents, mineral oil, metal deactivators, antiblocking agents, or a combination thereof. When present, such additives can be used in a total amount of less than or equal to 10 wt. %, specifically less than or equal to 5 wt. %, more specifically less than or equal to 1 wt. %, based on the total weight of the curable composition. A solvent can be present in the coating composition, but is preferably not used.

A method of forming a coated substrate comprises providing a substrate; coating the substrate with a UV light-curable coating composition to provide a coated substrate; and exposing the coated substrate to UV light to cure the coating composition to provide a cured coating. The choice of substrate is not critical, and can be organic or inorganic, for example a polymer, a glass, a ceramic, a metal, or a metal alloy. The substrate can be of any shape suitable for coating. The coating is applied at a thickness effective to provide the desired thickness of the cured coating, for example a cured thickness of 0.01 to 10 millimeters. The intensity of UV light and duration of exposure are selected to provide the desired degree of cure. As stated above, use of UV light cure allows the use of heat-sensitive substrates. On the other hand, when a thermal initiator is present, the cured coating can be subjected to a heat cure after the light cure.

Depending upon the type and relative amounts of poly (phenylene ether) oligomer; curable monomer, oligomer, polymer, or combination thereof; and photoinitiator, the glass transition temperature of the cured composition can be 100-200° C., specifically 120-200° C., and more specifically 120-170° C. In some aspects, the glass transition temperature is 120-150° C.

The cured coating can exhibit good impact strength. In some aspects, the composition exhibits an unnotched Izod impact strength of at least 400 joules per meter, specifically 400-600 joules per meter, more specifically 450-550 joules per meter, and still more specifically 480-520 joules per meter, as measured at 23° C. with a hammer energy of 2 foot-pounds in accordance with ASTM D 4812-06.

The cured coating can exhibit a water absorption of less than or equal to 5 wt. %, less than or equal to 4 wt. %, less than or equal to 3 wt. %, less than or equal to 2 wt. %, or less than or equal to 1 wt. % measured after immersion in deionized water at 25° C. for 24 hours.

The cured coating can also exhibit a number of advantageous properties simultaneously. In some aspects, the cured composition can exhibit at least one of the following properties: a glass transition temperature of 120-200° C.; a water adsorption of less than or equal to 1 wt. %, measured after immersion in deionized water at 25° C. for 24 hours. In some aspects, the cured composition can exhibit both of the properties.

The coating compositions are useful in a wide variety of applications, for example electrical and electronic articles, for optical fibers, medical devices, and industrial and construction applications. The coatings can be used for adhesive bonding and assembly of components, component marking, gasketing and sealing, potting, masking, encapsulating, coatings for alloy wheels and under the hood parts. Coatings for industrial and construction applications such as metal panels, plastics, and metal pipes can be mentioned, as well as wood primers.

Further disclosed herein is an article, at least one surface of which is coated with the cured coating. The coating can be in the form of a layer, an encapsulant, an adhesive, a sealant, a molded coating, a prepreg, a casing, or a laminate. The article can be a device or a component of a device for use in electronics, medical applications, industrial applications, construction applications, automotive applications, telecommunications, consumer applications, and the like.

This disclosure is further illustrated by the following examples, which are non-limiting.

EXAMPLES

The materials used in these examples are shown in Table 1.

TABLE 1

| Component | Description (trade name) | Supplier |
| --- | --- | --- |
| PPE | Methacrylate-capped poly(polyphenylene ether) oligomer, NORYL SA9000 | SABIC |
| DPGDA | Dipropylene glycol diacrylate, CAS No. 57472-68-1, LAROMER DPGDA | BASF |
| HDDA | Hexanediol diacrylate, CAS No. 13048-33-4, LAROMER HDDA | BASF |
| TPGDA | Tripropylene glycol diacrylate, CAS No. 42978, LAROMER TPGDA | BASF |
| PA-1 | Amine-modified polyether acrylate, CAS 28961-43-5, LAROMER PO94F | BASF |
| PA-2 | Polyester acrylate, reactive diluent, CAS 15625-89-5, LAROMER PR 9119 | BASF |
| PA-3 | Aliphatic urethane acrylate in dipropylene glycol diacrylate, CAS No. 4986-89-4, LAROMER UA 9048 | BASF |
| PA-4 | Aliphatic urethane acrylate in 4-t-butylcyclohexyl acrylate, CAS No. 84100-23-2, LAROMER UA 9072 | BASF |
| PA-5 | Polyurethane acrylate, CAS No. 52404-33-8, LAROMER UA 9089 | BASF |
| Initiator | 2,2-Dimethoxy-2-phenylacetophenone, CAS No. 24650-42-8 | Sigma-Aldrich |
| I-1 | Isobornyl acrylate, CAS No. 5888-33-5 | Sigma-Aldrich |
| I-2 | Isobornyl methacrylate, CAS No. 7534-94-3 | Sigma-Aldrich |

The poly(phenylene ether) oligomer used in the present examples comprises repeating units derived from 2,6-dimethylphenol and tetramethylbisphenol A, having vinyl end groups and having an intrinsic viscosity of 0.09 dl/g and a number average molecular weight of 2,300 grams/mole, available as NORYL Resin SA9000 from SABIC.

The formulations and properties of Comparative Example 1 (CE1) and Examples 1-10 (E1-E10) are shown in Table 2.

TABLE 2

| Component | Unit | CE1 | E1 | E2 | E3 | E4 | E5 | E6 | E7 | E8 | E9 | E10 |
| --- | --- | --- | --- | --- | --- | --- | --- | --- | --- | --- | --- | --- |
| PPE | g | 10 | 6 | 6 | 1.5 | 1.5 | 6 | 1.5 | 2 | 1.5 | 6 | 6 |
| Initiator | g | 0.1 | 0.2 | 0.2 | 0.15 | 0.15 | 0.2 | 0.15 | 0.2 | 0.15 | 0.2 | 0.2 |
| DPGDA | g | | 14 | | | | | 3.5 | | | | |
| HDDA | g | | | 14 | 3.5 | 3.5 | | | | 3.5 | | |
| TPGDA | g | | | | | | 14 | | | | | |
| PA-1 | g | | | | 10 | | | | | | | |
| PA-2 | g | | | | | 10 | | | | | | |
| PA-3 | g | | | | | | | 10 | | | | |
| PA-4 | g | | | | | | | | 18 | | | |
| PA-5 | g | | | | | | | | | 10 | | |
| I-1 | g | | | | | | | | | | 14 | |
| I-2 | g | | | | | | | | | | | 14 |

The formulations were prepared by dissolving the PPE and photoinitiator in the respective acrylate at 80° C. After complete dissolution, the solutions were applied in between two glass plates and placed under a UV lamp (features 100 watts of 365 nm longwave UV) for 10 minutes. The films were than peeled from the glass plates and soaked in chloroform to test for swelling. If the film was insoluble in chloroform, this indicated the formation of three-dimensional (3D) network structure.

Examples 1, 2, 5, 7, 9, and 10 were insoluble in chloroform, indicating that these compositions formed 3D network structures. This could have been due to the greater amount of photoinitiator present in the reaction mixtures (0.2 g). As for Examples 9 and 10, the cured materials were soluble at least in part because I-1 and I-2 are monofunctional.

The formulations and properties of Comparative Example 1 (CE1-CE5) and Examples 11-14 (E11-E14) are shown in Table 3.

TABLE 3

| Component | Unit | CE2 | CE3 | CE4 | CE5 | E11 | E12 | E13 | E14 |
|---|---|---|---|---|---|---|---|---|---|
| PPE | g | | | | | 6 | 6 | 6 | 2 |
| Initiator | g | 0.1 | 0.1 | 0.1 | 0.1 | 0.2 | 0.2 | 0.2 | 0.2 |
| DPGDA | g | 10 | | | | 14 | | | |
| HDDA | g | | 10 | | | | 14 | | |
| TPGDA | g | | | 10 | | | | 14 | |
| PA-4 | g | | | | 10 | | | | 18 |
| Property | | | | | | | | | |
| Tg | ° C. | 129 | 102 | 67 | | 158 | 194 | 120 | |

The amount of the initiator was kept constant for Comparative Examples (CE1-CE5) and Examples 11-14 (E11-E14). For instance, 0.1 g initiator was used for 10 g resin and 0.2 g initiator was used for 20 g of resin. In Comparative Examples 2-5 PPE resin was absent. As shown in Table 3, when PPE was present, Tg as measured by differential scanning calorimetry (DSC) was improved. For example, a comparison of CE2 and E11, CE3 and E12, CE4 and E13, and CE5 and E14 showed increases of 29, 92, and 53° C., respectively. The Tg for CE4 and E14 could not be measured by DSC because PPE was soluble in PA-4.

This disclosure further encompasses the following aspects.

Aspect 1: A ultraviolet light-curable coating composition comprising: 5-40 wt. % of a UV light-curable poly(polyphenylene ether) oligomer; 60-95 wt. % of a UV light-curable monomer, oligomer, polymer, or a combination thereof; and 0.01-3 wt. % of a photoinitiator activated by ultraviolet light.

Aspect 2: The ultraviolet light-curable coating composition of aspect 1, wherein the bifunctional poly(polyphenylene ether) oligomer is of the formula

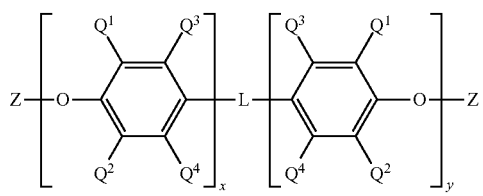

wherein each occurrence of $Q^1$ and $Q^2$ is independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, or $C_{2-12}$ halohydrocarbyloxy wherein at least two carbon atoms separate the halogen and oxygen atoms; x and y are each independently 0-30; Z is hydrogen, allyl, vinyl, or (meth)acrylate provided that at least one Z is allyl, vinyl, or (meth)acrylate; L is of the formula

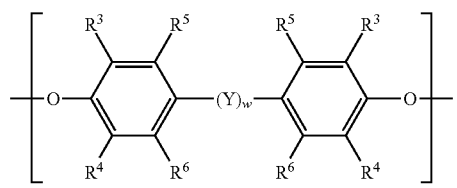

wherein each occurrence of $R^3$, $R^4$, $R^5$, and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; w is 0 or 1; and Y is

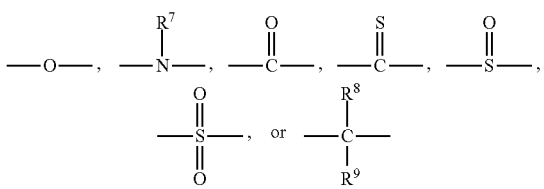

wherein each occurrence of $R^7$ is independently hydrogen or $C_{1-12}$ hydrocarbyl, each occurrence of $R^8$ and $R^9$ is independently hydrogen, $C_{1-12}$ hydrocarbyl, or $R^8$ and $R^9$ together form a $C_{4-12}$ cyclohydrocarbylene with the carbon atom; or L is of the formula

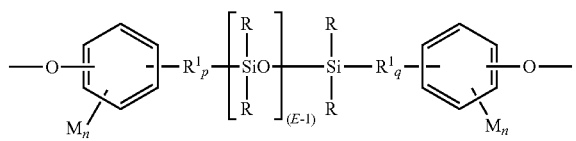

wherein E is 6-100, each occurrence of R is independently an unsubstituted or substituted $C_{1-13}$ alkyl, $C_{1-13}$ alkoxy, $C_{3-6}$ cycloalkyl, $C_{3-6}$ cycloalkoxy, $C_{6-14}$ aryl, $C_{6-10}$ aryloxy, $C_{7-13}$ arylalkylene, or $C_{7-13}$ alkylarylene, each p and q are independently 0 or 1, $R^1$ is a divalent $C_{2-8}$ aliphatic group, each occurrence of M is independently halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkylaryl, or $C_{7-12}$ alkylaryloxy, and each n is independently 0, 1, 2, 3, or 4.

Aspect 3: The ultraviolet light-curable coating composition of aspect 1, wherein the poly(polyphenylene ether) oligomer comprises at least one allyl, vinyl, or (meth)acrylate terminal group; a poly(polyphenylene ether) block of the formula

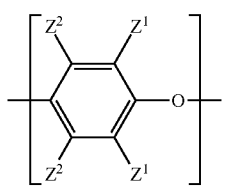

wherein each occurrence of $Z^1$ is independently halogen, unsubstituted or substituted $C_{1-12}$ primary or secondary hydrocarbyl, $C_{1-12}$ hydrocarbylthio, $C_{1-12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and a polysiloxane block comprising repeating units of the formula

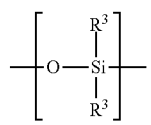

wherein each occurrence of $R^3$ is independently $C_{1-12}$ hydrocarbyl or $C_{1-12}$ halohydrocarbyl; and the polysiloxane block further comprises a terminal unit of formula (6)

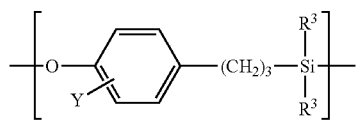

wherein Y is hydrogen, halogen, $C_{1-12}$ hydrocarbyl, or $C_{1-12}$ hydrocarbyloxy, and each occurrence of $R^3$ is independently hydrogen, $C_{1-12}$ hydrocarbyl, or $C_{1-12}$ halohydrocarbyl, preferably wherein Y is hydrogen, halogen, $C_{1-6}$ hydrocarbyl, or $C_{1-6}$ hydrocarbyloxy, and each occurrence of $R^3$ is independently hydrogen, $C_{1-6}$ hydrocarbyl, or $C_{1-6}$ halohydrocarbyl, more preferably wherein Y is hydrogen, methyl, or methoxy, and each $R^3$ is methyl.

Aspect 4: The ultraviolet light-curable coating composition of aspect 1, wherein the bifunctional poly(polyphenylene ether) oligomer comprises the polysiloxane block is of the formula

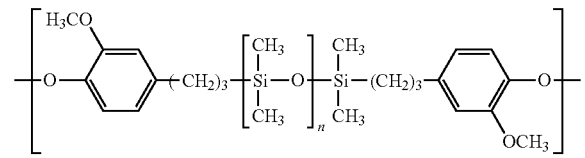

wherein n has an average value of 5-100, or 10-80 or 10-60.

Aspect 5: The ultraviolet light-curable coating composition of aspect 1, wherein the poly(polyphenylene ether) oligomer comprises at least one terminal (meth)acrylate group, preferably two terminal methacrylate groups.

Aspect 6: The ultraviolet light-curable coating composition of aspect 1, wherein the ultraviolet light-curable poly(polyphenylene ether) is of the formula

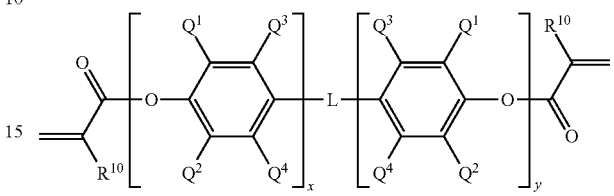

wherein each occurrence of $Q^1$ and $Q^2$ is independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; each occurrence of $Q^3$ and $Q^4$ is independently hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, or $C_{2-12}$ halohydrocarbyloxy wherein at least two carbon atoms separate the halogen and oxygen atoms; x and y are each independently 0-30; and L is of the formula

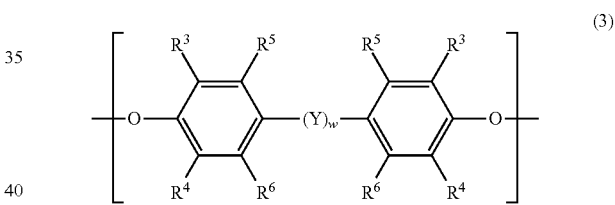

wherein each occurrence of $R^3$, $R^4$, $R^5$, and $R^6$ is independently hydrogen, halogen, unsubstituted or substituted $C_{1-6}$ primary or secondary hydrocarbyl, $C_{1-6}$ hydrocarbylthio, $C_{1-6}$ hydrocarbyloxy, or $C_{2-6}$ halohydrocarbyloxy wherein at least two carbon atoms separate the halogen and oxygen atoms; w is 0 or 1; $R^{10}$ is methyl or hydrogen and Y is

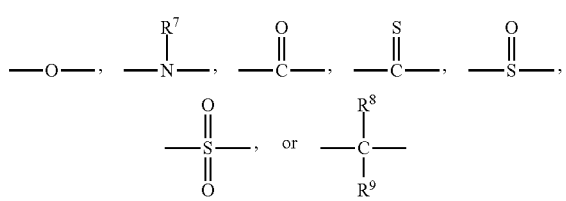

wherein each occurrence of $R^7$ is independently hydrogen or $C_{1-6}$ hydrocarbyl, each occurrence of $R^8$ and $R^9$ is independently hydrogen, $C_{1-6}$ hydrocarbyl, or $R^8$ and $R^9$ together form a $C_{4-6}$ cyclohydrocarbylene with the carbon atom.

Aspect 7: The ultraviolet light-curable coating composition of aspect 1, wherein the ultraviolet light-curable poly(polyphenylene ether) comprises

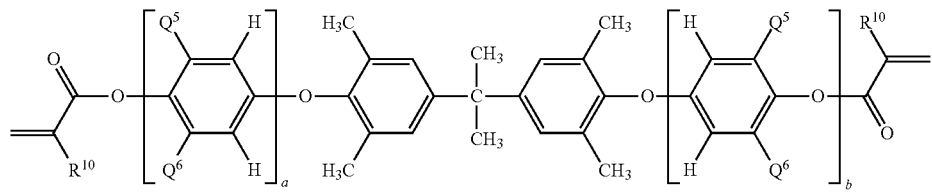

wherein each occurrence of $Q^5$ and $Q^6$ is independently methyl, cyclohexyl, phenyl, di-n-butylaminomethyl, or morpholinomethyl; each occurrence of a and b is independently 0-20, with the proviso that the sum of a and b is at least 2; and each occurrence of $R^{10}$ is independently methyl or hydrogen; preferably wherein each occurrence of $Q^5$ and $Q^6$ is independently methyl, cyclohexyl, phenyl, di-n-butylaminomethyl, or morpholinomethyl, and each $R^{10}$ is methyl.

Aspect 8: The ultraviolet light-curable coating composition of aspect 1, wherein the ultraviolet light-curable poly (polyphenylene ether) has a number average molecular weight of 500-7,000 g/mol, and a weight average molecular weight of 500-15,000 g/mol, as determined by gel permeation chromatography using polystyrene standards.

Aspect 9: The ultraviolet light-curable coating composition of aspect 1, wherein the UV light-curable monomer, oligomer, or polymer is a (meth)acrylate.

Aspect 10: The ultraviolet light-curable coating composition of aspect 1, wherein the curable monomer, oligomer, or polymer is dipropylene glycol diacrylate, 1,6-hexanediol diacrylate, tripropylene glycol diacrylate, isobornyl acrylate, isobornyl methacrylate, a polyether acrylate, an amine-modified polyether acrylate, a polyester acrylate, a polyurethane acrylate, an aliphatic urethane acrylate, or a combination thereof.

Aspect 11: The ultraviolet light-curable coating composition of aspect 1 comprising: 20-40 wt. % of the ultraviolet light-curable poly(polyphenylene ether); 60-80 wt. % of the UV light-curable monomer, oligomer, polymer, or a combination thereof; and 0.1-3 wt. % of the photoinitiator.

Aspect 12: The ultraviolet light-curable coating composition of aspect 1 comprising: 20-40 wt. % of a meth (acrylate)-endcapped poly(polyphenylene ether) oligomer; 60-80 wt. % of a combination of a dipropylene glycol diacrylate, 1,6-hexanediol diacrylate, tripropylene glycol diacrylate, a polyether acrylate, an amine modified polyether acrylate, a polyester acrylate, a polyurethane acrylate, an aliphatic urethane acrylate, isobornyl acrylate, isobornyl methacrylate; and 0.1-3 wt. % of a photoinitiator.

Aspect 13: A cured product of the curable composition of aspect 1, having a glass transition temperature of 120-200° C.; a water absorption of less than or equal to 1 wt. % measured after immersion in deionized water at 25° C. for 24 hours, or a combination thereof.

Aspect 14: A method of forming a coated substrate, the method comprising providing a substrate; coating the substrate with the ultraviolet light-curable coating composition of any one of aspects 1-12 to provide a coated substrate; and curing the coating composition with ultraviolet light.

Aspect 15: An article comprising the coated substrate of aspect 13, wherein the coating is in the form of a layer, an encapsulant, an adhesive, a sealant, a molded coating, a prepreg, a casing, or a laminate.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or 5 wt. %-20 wt. %", is inclusive of the endpoints and all intermediate values of the ranges of "5 wt. %-25 wt. %,"). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some aspects," "an aspects," and so forth, means that a particular element described in connection with the aspects is included in at least one aspects described herein, and may or may not be present in other aspects. In addition, it is to be understood that the described elements may be combined in any suitable manner in the various aspects. A "combination thereof" is open and includes any combination comprising at least one of the listed components or properties optionally together with a like or equivalent component or property not listed Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. "(Meth) acrylate" is inclusive of both acrylate and methacrylate groups.

As used herein, the term "hydrocarbyl," whether used by itself or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As an example, $Z^1$ in formula (1) can be a di-n-butylaminomethyl group formed by reaction of a terminal 3,5-dimethyl-1,4-phenyl group with the di-n-butylamine component of an oxidative polymerization catalyst.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl)a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example, the group —CH$_2$CH$_2$CN is a $C_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An ultraviolet light-curable coating composition comprising:
   5-40 weight percent of an ultraviolet light-curable poly(polyphenylene ether) oligomer;
   60-95 weight percent of an ultraviolet light-curable monomer, oligomer, polymer, or a combination thereof, wherein the monomer comprises a linear or branched alkyl group, a non-aromatic cyclic group, or a partially aromatic group; and
   0.01-3 weight percent of a photoinitiator activated by ultraviolet light.

2. The ultraviolet light-curable coating composition of claim 1, wherein the ultraviolet light-curable poly(polyphenylene ether) oligomer comprises the structure

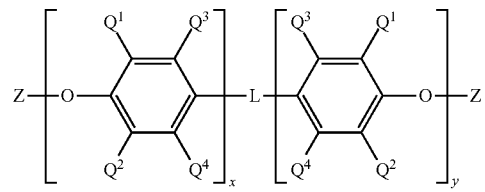

wherein
  each occurrence of $Q^1$ and $Q^2$ is independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;
  each occurrence of $Q^3$ and $Q^4$ is independently hydrogen, halogen, unsubstituted or substituted $C_1$-$C_{12}$ primary or secondary hydrocarbyl, $C_1$-$C_{12}$ hydrocarbylthio, $C_{1-12}$ hydrocarbyloxy, or $C_{2-12}$ halohydrocarbyloxy wherein at least two carbon atoms separate the halogen and oxygen atoms;
  x and y are each independently 0-30;
  Z is hydrogen, allyl, vinyl, or (meth)acrylate provided that at least one Z is allyl, vinyl, or (meth)acrylate;
  L is of the formula

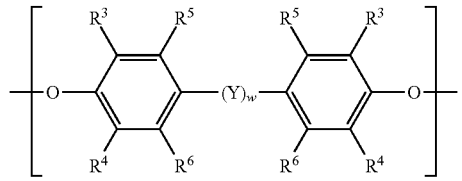

wherein
  each occurrence of $R^3$, $R^4$, $R^5$, and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms;
  w is 0 or 1; and
  Y is

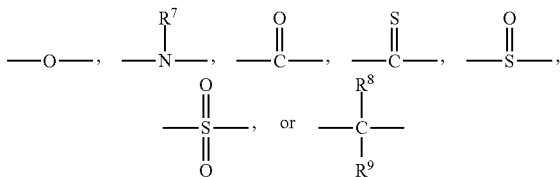

wherein
  each occurrence of $R^7$ is independently hydrogen or $C_{1-12}$ hydrocarbyl,
  each occurrence of $R^8$ and $R^9$ is independently hydrogen, $C_{1-12}$ hydrocarbyl, or R$^8$ and R$^9$ together form a C$_{4-12}$ cyclohydrocarbylene with the carbon atom; or L is of the formula

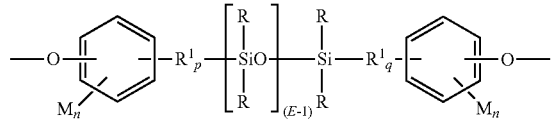

wherein
E is 6-100,
each occurrence of R is independently an unsubstituted or substituted C$_{1-13}$ alkyl, C$_{1-13}$ alkoxy, C$_{3-6}$ cycloalkyl, C$_{3-6}$ cycloalkoxy, C$_{6-14}$ aryl, C$_{6-10}$ aryloxy, C$_{7-13}$ arylalkylene, or C$_{7-13}$ alkylarylene; each p and q are independently 0 or 1,
R$^1$ is a divalent C$_{2-8}$ aliphatic group,
each occurrence of M is independently halogen, cyano, nitro, C$_{1-8}$ alkylthio, C$_{1-8}$ alkyl, C$_{1-8}$ alkoxy, C$_{2-8}$ alkenyl, C$_{2-8}$ alkenyloxy, C$_{3-8}$ cycloalkyl, C$_{3-8}$ cycloalkoxy, C$_{6-10}$ aryl, C$_{6-10}$ aryloxy, C$_{7-12}$ aralkyl, C$_{7-12}$ aralkoxy, C$_{7-12}$ alkylaryl, or C$_{7-12}$ alkylaryloxy, and
each n is independently 0, 1, 2, 3, or 4.

3. The ultraviolet light-curable coating composition of claim 1, wherein the ultraviolet light-curable poly(polyphenylene ether) oligomer comprises
at least one allyl, vinyl, or (meth)acrylate terminal group;
a poly(polyphenylene ether) block of the formula

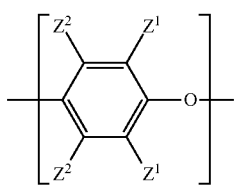

wherein
each occurrence of Z$^1$ is independently halogen, unsubstituted or substituted C$_{1-12}$ primary or secondary hydrocarbyl, C$_{1-12}$ hydrocarbylthio, C$_{1-12}$ hydrocarbyloxy, or C$_2$-C$_{12}$ halohydrocarbyloxy wherein at least two carbon atoms separate the halogen and oxygen atoms, and
each occurrence of Z$^2$ is independently hydrogen, halogen, unsubstituted or substituted C$_{1-12}$ primary or secondary hydrocarbyl, C$_{1-12}$ hydrocarbylthio, C$_{1-12}$ hydrocarbyloxy, or C$_{2-12}$ halohydrocarbyloxy wherein at least two carbon atoms separate the halogen and oxygen atoms; and a polysiloxane block comprising repeating units of the formula
a polysiloxane block comprising repeating units having the structure

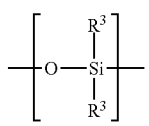

wherein
each occurrence of R$^3$ is independently C$_{1-12}$ hydrocarbyl or C$_{1-12}$ halohydrocarbyl, and the polysiloxane block further comprises a terminal unit of formula (6)

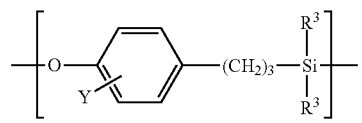

wherein
Y is hydrogen, halogen, C$_{1-12}$ hydrocarbyl, or C$_{1-12}$ hydrocarbyloxy, and
each occurrence of R$^3$ is independently hydrogen, C$_{1-12}$ hydrocarbyl, or C$_{1-12}$ halohydrocarbyl.

4. The ultraviolet light-curable coating composition of claim 1, wherein the ultraviolet light-curable poly(polyphenylene ether) oligomer comprises the polysiloxane block is of the formula

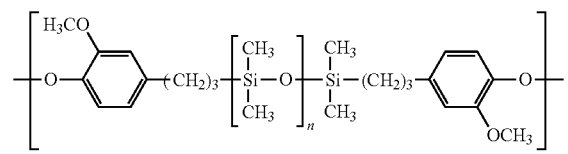

wherein n has an average value of 5-100.

5. The ultraviolet light-curable coating composition of claim 1, wherein the poly(polyphenylene ether) oligomer comprises at least one terminal (meth)acrylate group.

6. The ultraviolet light-curable coating composition of claim 1, wherein the ultraviolet light-curable poly(polyphenylene ether) comprises the formula

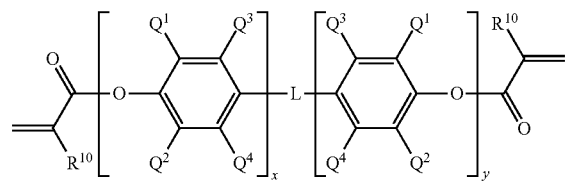

wherein
each occurrence of Q$^1$ and Q$^2$ is independently halogen, unsubstituted or substituted C$_{1-6}$ primary or secondary hydrocarbyl, C$_{1-6}$ hydrocarbylthio, C$_{1-6}$ hydrocarbyloxy, or C$_{2-6}$ halohydrocarbyloxy wherein at least two carbon atoms separate the halogen and oxygen atoms;
each occurrence of Q$^3$ and Q$^4$ is independently hydrogen, halogen, unsubstituted or substituted C$_1$-C$_6$ primary or secondary hydrocarbyl, C$_1$-C$_6$ hydrocarbylthio, C$_{1-6}$ hydrocarbyloxy, or C$_{2-6}$ halohydrocarbyloxy wherein at least two carbon atoms separate the halogen and oxygen atoms;

x and y are each independently 0-30; and
L is of the formula (3)

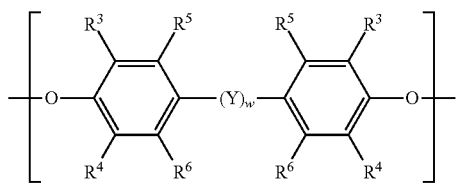
(3)

wherein
each occurrence of $R^3$, $R^4$, $R^5$, and $R^6$ is independently hydrogen, halogen, unsubstituted or substituted $C_{1-6}$ primary or secondary hydrocarbyl, $C_{1-6}$ hydrocarbylthio, $C_{1-6}$ hydrocarbyloxy, or $C_{2-6}$ halohydrocarbyloxy wherein at least two carbon atoms separate the halogen and oxygen atoms;
w is 0 or 1;
$R^{10}$ is methyl or hydrogen; and
Y is

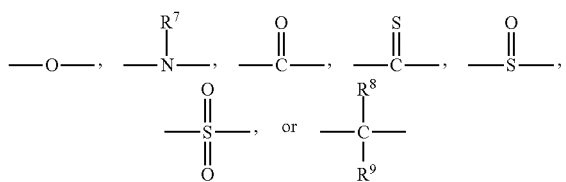

wherein
each occurrence of $R^7$ is independently hydrogen or $C_{1-6}$ hydrocarbyl,
each occurrence of $R^8$ and $R^9$ is independently hydrogen, $C_{1-6}$ hydrocarbyl.

7. The ultraviolet light-curable coating composition of claim 1, wherein the ultraviolet light-curable poly(polyphenylene ether) oligomer is of the formula

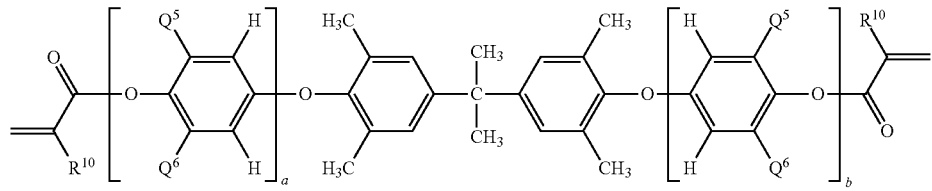

wherein
each occurrence of $Q^5$ and $Q^6$ is independently methyl, cyclohexyl, phenyl, di-n-butylaminomethyl, or morpholinomethyl;
each occurrence of a and b is independently 0-20, with the proviso that the sum of a and b is at least 2; and
each occurrence of $R^{10}$ is methyl or hydrogen.

8. The ultraviolet light-curable coating composition of claim 1, wherein the ultraviolet light-curable poly(polyphenylene ether) has a number average molecular weight of 500-7,000 g/mol, and a weight average molecular weight of 500-15,000 g/mol, as determined by gel permeation chromatography using polystyrene standards.

9. The ultraviolet light-curable coating composition of claim 1, wherein the ultraviolet light-curable monomer, oligomer, or polymer is a (meth)acrylate.

10. The ultraviolet light-curable coating composition of claim 9, wherein the curable monomer, oligomer or polymer is dipropylene glycol diacrylate, 1,6-hexanediol diacrylate, tripropylene glycol diacrylate, isobornyl acrylate, isobornyl methacrylate a polyether acrylate, an amine-modified polyether acrylate, a polyester acrylate, a polyurethane acrylate, an aliphatic urethane acrylate, or a combination thereof.

11. The ultraviolet light-curable coating composition of claim 1 comprising:
20-40 weight percent of the ultraviolet light-curable poly(polyphenylene ether) oligomer;
60-80 weight percent of the ultraviolet light-curable monomer, oligomer, polymer, or a combination thereof; and
0.1-3 weight percent of a photoinitiator.

12. The ultraviolet light-curable coating composition of claim 1 comprising:
20-40 weight percent of a meth(acrylate)-endcapped poly(polyphenylene ether) oligomer;
60-80 weight percent of dipropylene glycol diacrylate, 1,6-hexanediol diacrylate, tripropylene glycol diacrylate, a polyether acrylate, an amine-modified polyether acrylate, a polyester acrylate, a polyurethane acrylate, an aliphatic urethane acrylate, isobornyl acrylate, isobornyl methacrylate, or a combination thereof; and
0.1-3 weight percent of a photoinitiator.

13. A cured product of the curable composition of claim 1, having
a glass transition temperature of 120-200° C.;
a water absorption of less than or equal to 1 weight percent measured after immersion in deionized water at 25° C. for 24 hours, or
a combination thereof.

14. A method of forming a coated substrate, the method comprising
providing a substrate;
coating the substrate with an ultraviolet light-curable coating composition of claim 1 to provide a coated substrate; and
curing the coating composition with ultraviolet light.

15. An article comprising the thermoset composition of claim 13, wherein the coating is in the form of a layer, an encapsulant, an adhesive, a sealant, a molded coating, a prepreg, a casing, or a laminate.

16. The ultraviolet light-curable coating composition of claim 1 consisting of:
5-40 weight percent of the ultraviolet light-curable poly(polyphenylene ether) oligomer;

60-95 weight percent of the ultraviolet light-curable monomer, oligomer, polymer, or a combination thereof, wherein the monomer comprises a linear or branched alkyl group, a non-aromatic cyclic group, or a partially aromatic group;

0.01-3 weight percent of a photoinitiator activated by ultraviolet light; and 0-10 weight percent of an additive composition consisting of a stabilizer, mold release agent, a lubricant, a processing aid, a drip retardant, a nucleating agent, a UV blocker, a dye, a pigment, an antioxidant, an anti-static agent, a blowing agent, mineral oil, a metal deactivator, an anti-blocking agent, a solvent, or a combination thereof.

17. The ultraviolet light-curable coating composition of claim 1 consisting of:

5-40 weight percent of the ultraviolet light-curable poly(polyphenylene ether) oligomer;

60-95 weight percent of the ultraviolet light-curable monomer, oligomer, polymer, or a combination thereof, wherein the monomer comprises a linear or branched alkyl group, a non-aromatic cyclic group, or a partially aromatic group;

0.01-3 weight percent of a photoinitiator activated by ultraviolet light; and 0-5 weight percent of an additive composition consisting of a stabilizer, mold release agent, a lubricant, a processing aid, a drip retardant, a nucleating agent, a UV blocker, a dye, a pigment, an antioxidant, an anti-static agent, a blowing agent, mineral oil, a metal deactivator, an anti-blocking agent, a solvent, or a combination thereof.

18. The ultraviolet light-curable coating composition of claim 1, wherein the poly(polyphenylene ether) oligomer has an intrinsic viscosity of 0.05-0.1 deciliter per gram.

* * * * *